US012654452B2

(12) United States Patent
Orimolade et al.

(10) Patent No.: US 12,654,452 B2
(45) Date of Patent: Jun. 16, 2026

(54) SYSTEM AND METHOD FOR PRESERVING INKJET OPERATIONAL STATUS DURING LONG PERIODS OF PRINTER INACTIVITY

(71) Applicant: Xerox Corporation, Norwalk, CT (US)

(72) Inventors: Temitope Orimolade, Portland, OR (US); Varun Sambhy, Pittsford, NY (US); Seemit Praharaj, Webster, NY (US); Jason M. LeFevre, Penfield, NY (US); Santokh S. Badesha, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 217 days.

(21) Appl. No.: 18/476,125

(22) Filed: Sep. 27, 2023

(65) Prior Publication Data

US 2025/0100282 A1 Mar. 27, 2025

(51) Int. Cl.
*B41J 2/165* (2006.01)

(52) U.S. Cl.
CPC ....... *B41J 2/16552* (2013.01); *B41J 2/16505* (2013.01); *B41J 2/16526* (2013.01); *B41J 2/1652* (2013.01); *B41J 2/16532* (2013.01); *B41J 2002/16594* (2013.01)

(58) Field of Classification Search
CPC ......................... B41J 2/16552; B41J 2/16505; B41J 2/16526; B41J 2/1652; B41J 2/16532; B41J 2002/16594
See application file for complete search history.

(56) References Cited

U.S. PATENT DOCUMENTS 5,495,272 A * 2/1996 Yamaguchi ............ B41J 2/1707 347/93
7,891,759 B2 2/2011 Guhse et al.
10,696,052 B1 * 6/2020 LeFevre ................. B41J 2/1707
2001/0043250 A1 * 11/2001 Faisst, Jr. ............. B41J 2/16547 347/22

(Continued)

FOREIGN PATENT DOCUMENTS

EP 0561406 B1 6/2000
JP 2023047205 A 4/2023

OTHER PUBLICATIONS

Extended European Search Report corresponding to European Patent Application No. 24198810.4, dated Feb. 19, 2025. (10 Pages).

*Primary Examiner* — Geoffrey S Mruk
(74) *Attorney, Agent, or Firm* — Maginot Moore & Beck LLP

(57) ABSTRACT

An inkjet printer includes a printhead maintenance station that injects a high pH fluid into the inkjet stacks of the printheads in the printer to prevent ink contamination during long periods of printer inactivity. The printhead maintenance station includes a printhead cap having an opening, a printhead vent blocking member configured to block manifold vents in the printhead when the printhead engages the printhead vent blocking member, and a valve. The valve is positioned within the printhead cap to enable the printhead cap to hold a volume of high pH fluid entering the printhead cap through the opening in the printhead cap when the valve is closed and to enable egress of the high pH fluid when the valve is opened. A printhead is lowered onto the printhead cap and a vacuum applied to an ink supply line to the printhead to inject the high pH liquid into the printhead.

12 Claims, 6 Drawing Sheets

(56) References Cited

U.S. PATENT DOCUMENTS

| | | | |
|---|---|---|---|
| 2003/0128249 | A1 | 7/2003 | Booth |
| 2018/0304635 | A1 | 10/2018 | Mu et al. |
| 2019/0061356 | A1 | 2/2019 | Squires et al. |
| 2020/0254766 | A1 | 8/2020 | Hoover et al. |
| 2023/0256742 | A1 | 8/2023 | Ohshima et al. |

* cited by examiner

SYSTEM AND METHOD FOR PRESERVING INKJET OPERATIONAL STATUS DURING LONG PERIODS OF PRINTER INACTIVITY

TECHNICAL FIELD

This disclosure relates generally to devices that produce ink images on media, and more particularly, to the preservation of inkjet operational status during long periods of printer inactivity.

BACKGROUND

Inkjet imaging devices, also known as inkjet printers, eject liquid ink from printheads to form images on an image receiving surface. The printheads include a plurality of inkjets that are arranged in an array. Each inkjet has a thermal or piezoelectric actuator that is coupled to a printhead controller. The printhead controller generates firing signals that correspond to digital data content that define the images. The actuators in the printheads respond to the firing signals by expanding into an ink chamber fluidly connected to a nozzle to eject ink drops from the nozzle onto an image receiving surface to form an ink image that corresponds to the digital image content used to generate the firing signals. The image receiving surface is usually a continuous web of media material or a series of media sheets.

Inkjet printers used for producing color images typically include multiple printhead modules. Each printhead module includes one or more printheads that typically eject a single color of ink. In a typical inkjet color printer, four printhead modules are positioned in a process direction with each printhead module ejecting a different color of ink. The four ink colors most frequently used are cyan, magenta, yellow, and black. The common nomenclature for such printers is CMYK color printers. Some CMYK color printers have two printhead modules that print each color of ink. The printhead modules that print the same color of ink are offset from each other by one-half of the distance between adjacent inkjets in the cross-process direction to double the number of pixels per inch to increase the density of a line of the color of ink ejected by the printheads in the two modules. As used in this document, the term "process direction" means the direction of movement of the image receiving surface as it passes the printheads in the printer and the term "cross-process direction" means a direction that is perpendicular to the process direction in the plane of the image receiving surface.

Inkjets, especially those in printheads that eject aqueous inks, need to fire regularly to help prevent the ink in the nozzles from drying. Sometimes the nozzles in a printhead dry because the inkjets have ejected a substantial amount of ink to form high coverage areas in an ink image. The operation of a high proportion of inkjets in a portion of the faceplate on the printhead to print a high coverage area can produce a large number of satellite drops that tend to adhere to the faceplate. Satellite drops are small ink drops that separate from the larger drops that travel from the nozzles to the image receiving substrates. The buildup of these satellite drops on a faceplate can clog nozzles in the faceplate. Additionally, if the inkjets in a printhead are not operated frequently enough, such as when low ink area coverage image portions are printed, then the ink within an inkjet can dry and render the inkjet inoperative. To maintain the operational status of the inkjets, the printhead modules are moved from positions opposite the path of the image receiving substrates to printhead maintenance stations where the printheads are purged. Purging a printhead means a pressurized gas or liquid is applied to the ink supply chambers within a printhead to force ink from the chamber into the nozzles where the ink is emitted from the nozzles onto the faceplate. One or more wipers are then moved across the faceplate to remove the purged ink from the faceplate into a waste ink receptacle.

During long periods of printer inactivity, such as overnight or weekend shutdowns, some inks deteriorate in the nozzles and contaminate a printhead by producing buildup on rock screens, manifolds, piezoelectric tiles, and nozzles within the printheads. This contamination results in streaks in ink images produced when the printer is returned to service, lower ink drop mass, vent line failures, intermittent firing, missing, or mis-directional ink drops from the inkjets, and eventually unrecoverable inkjets, even after purging.

Contamination appears to occur due to chemical and physical stresses in the inkjet stack of the printhead that increase pigment particle size and viscosity of the ink. This contamination may lead to irreversible printhead damage. While reformulation of the inks may remedy the contamination issues, that process is an expensive and lengthy endeavor. Additionally, changes in the ink composition may adversely affect image quality. Thus, inkjet printers would benefit from being able to stabilize ink properties during long periods of printer inactivity without changing ink compositions.

SUMMARY

A printhead maintenance station for a color inkjet printer is configured to stabilize ink properties during long periods of printer inactivity without changing ink compositions. The printhead maintenance station includes a printhead cap configured to cover a face of a printhead; an opening in the printhead cap; a printhead vent blocking member configured to block manifold vents in the printhead when the printhead is moved to engage the printhead vent blocking member; and a valve configured to open and close, the valve being positioned within the printhead cap to enable the printhead cap to hold a volume of high pH fluid entering the printhead cap through the opening in the printhead cap when the valve is closed and to enable egress of the high pH fluid from the printhead cap when the valve is opened.

A method of operating a printhead maintenance station stabilizes ink properties during long periods of printer inactivity without changing ink compositions. The method includes filling a printhead cap having a manifold vent blocking member with the high pH liquid; lowering a printhead onto the printhead cap to block manifold vents in the printhead and contact the nozzle plate of the printhead with the high pH fluid; and applying a vacuum to an ink supply line of the printhead to pull the high pH fluid into the printhead.

An inkjet printer includes a printhead maintenance station that is configured to stabilize ink properties during long periods of printer inactivity without changing ink compositions. The inkjet printer includes at least one printhead module configured with at least one printhead; a printhead maintenance module having a printhead cap with a manifold vent blocking member, an opening in the printhead cap, a printhead vent blocking member configured to block manifold vents in the printhead when the at least one printhead is moved to engage the printhead vent blocking member, and a valve configured to open and close, the valve being positioned within the printhead cap to enable the printhead cap to hold a volume of high pH fluid entering the printhead cap through the opening in the printhead cap when the valve is closed and to enable egress of the high pH fluid from the printhead cap when the valve is opened; and a controller operatively connected to the at least one printhead module and the printhead maintenance station. The controller is configured to: fill the printhead cap with the high pH liquid; lower the at least one printhead onto the printhead cap to block manifold vents in the printhead and contact the nozzle plate of the printhead with the high pH fluid; and apply a vacuum to an ink supply line of the printhead to pull the high pH fluid into the printhead.

A high pH fluid has been developed that is useful for preserving printheads during periods of inactivity of at least two hours. The high pH fluid includes a fluid; and a base added to the fluid that raises the pH level of the fluid to at least 8.

BRIEF DESCRIPTION OF THE DRAWINGS

The foregoing aspects and other features of a printhead maintenance station and printhead maintenance station operational method so the printer stabilizes ink properties during long periods of printer inactivity without changing ink compositions are explained in the following description, taken in connection with the accompanying drawings.

DETAILED DESCRIPTION

Figure 1:
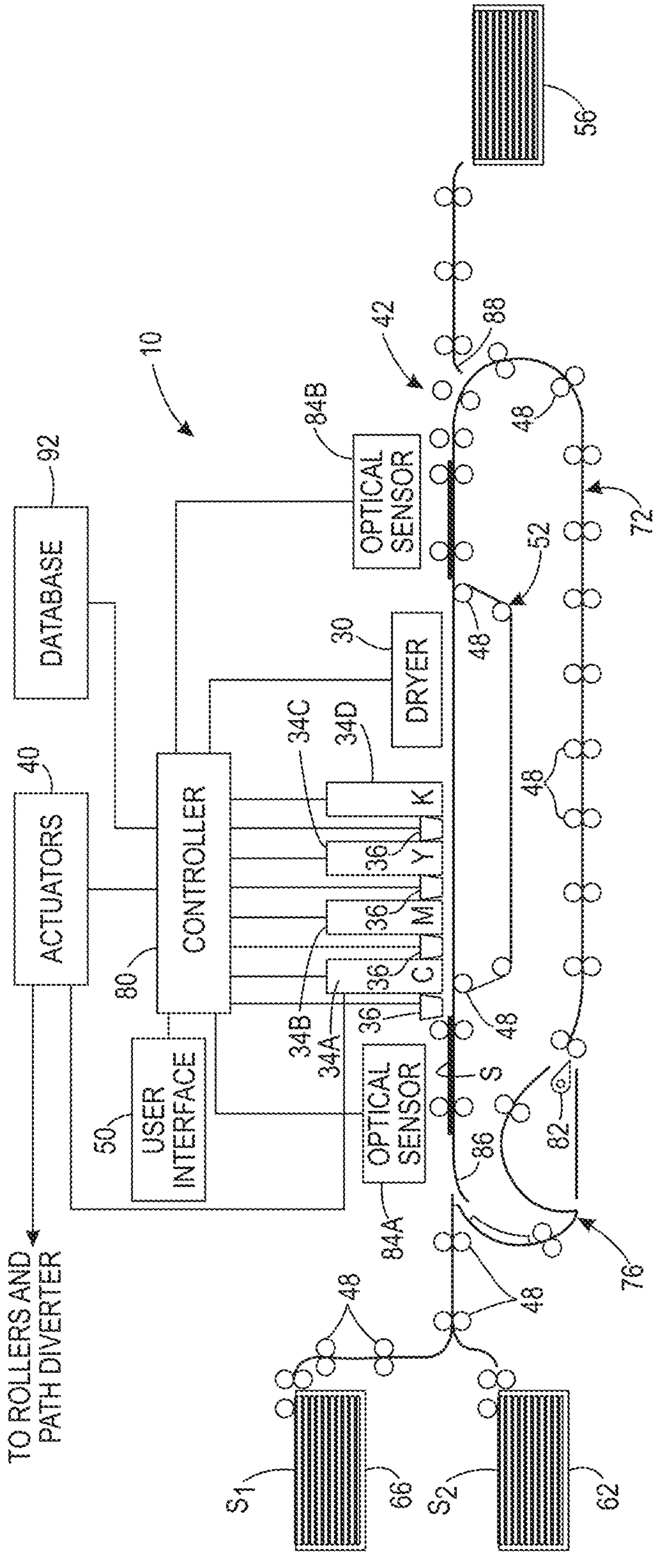
FIG. 1 is a schematic drawing of a color inkjet printer that stabilizes ink properties during long periods of printer inactivity without changing ink compositions.

For a general understanding of the environment for the printhead maintenance station and the printhead maintenance station operational method disclosed herein as well as the details for the printhead maintenance station and the printhead maintenance station operational method, reference is made to the drawings. In the drawings, like reference numerals have been used throughout to designate like elements. As used herein, the word "printer" encompasses any apparatus that ejects ink drops onto different types of media to form ink images.

FIG. 1 depicts a high-speed color inkjet printer 10 that stabilizes ink properties during long periods of printer inactivity without changing ink compositions. As used in this document, the term "long period of printer inactivity" means at least two hours of no printing being performed by a printer. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to rollers or to at least one driving roller of conveyor 52 that comprise a portion of the media transport 42 that passes through the print zone PZ (shown in FIG. 2) of the printer. In one embodiment, each printhead module has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead in the module to be printed. Additionally, the printheads within a module or between printheads in different modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

Figure 2:
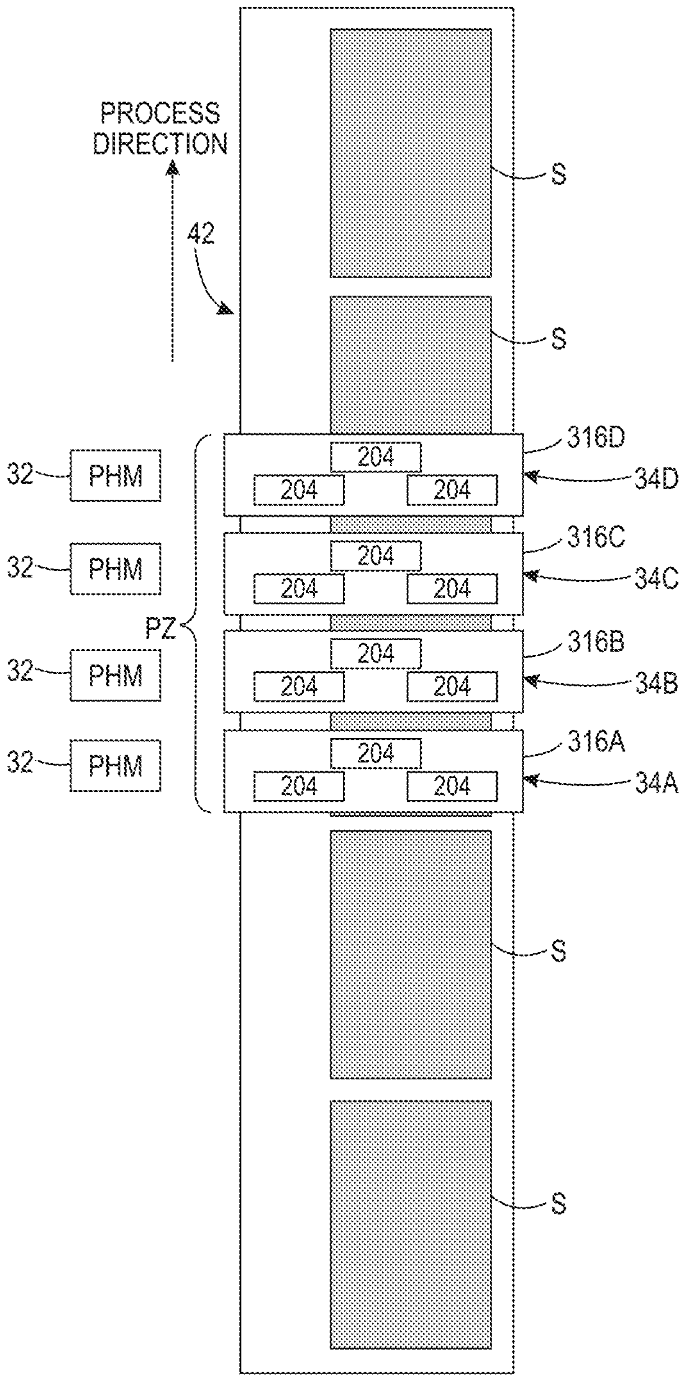
FIG. 2 depicts the print zone of the printer shown in FIG. 1 and the printhead maintenance stations positioned adjacent to the print zone.

The print zone PZ in the printer 10 of FIG. 1 is shown in FIG. 2. The print zone PZ has a length in the process direction commensurate with the distance from the first inkjets that a sheet passes in the process direction to the last inkjets that a sheet passes in the process direction and it has a width that is the maximum distance between the most outboard inkjets on opposite sides of the print zone that are directly across from one another in the cross-process direction. Each printhead module 34A, 34B, 34C, and 34D shown in FIG. 2 has three printheads 204 mounted to one of the printhead carrier plates 316A, 316B, 316C, and 316D, respectively. Adjacent to the print zone PZ are four printhead maintenance stations (PHM) 32. When the printer is going to be inactive for at least two hours of time, printing operations are halted and the printhead modules are moved from the print zone PZ to a position opposite the adjacent printhead maintenance stations 32. The printhead maintenance station is operated as described in more detail below to inject a high pH fluid into the ink flow paths within the printheads that are susceptible to ink contamination. As used in this document, the term "print zone" means an area of a media transport opposite the printheads of an inkjet printer.

With further reference to FIG. 1, the printed image exits the print zone PZ and passes under an image dryer 30 after the ink image is printed on a sheet S. The image dryer 30 can include an infrared heater, a heated air blower, air returns, or combinations of these components to heat the ink image and at least partially fix an ink image to the sheet S. An infrared heater applies infrared heat to the printed image on the surface of the sheet S to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

Controller 80 operates at least one of the actuators 40 to rotate a pivoting member at position 88 to either direct a sheet to receptacle 56 or to return path 72. A sheet S is moved by the rotation of rollers along the return path 72 in a direction opposite to the direction of movement in the process direction past the printheads. Pivoting member 82 is operated by the controller 80 to either direct the sheet along a curved portion of the return path 72 into inverter 76 so the sheet is turned over for duplex printing or along the straight portion of the return path 72. When the sheet follows the straight portion, the inverter 76 is bypassed and the side of the sheet previously printed can be printed again. The controller operates one of the actuators 40 to move the pivoting member 82 clockwise to direct a sheet into the inverter 76 and counterclockwise to bypass the inverter. Regardless of whether the substrate is inverted or not, it merges into the job stream being carried by the media transport 42 when controller 80 operates another actuator 40 to rotate pivoting member 86 to provide ingress of a sheet S from return path 72 to the job stream entering the print zone PZ.

As further shown in FIG. 1, the printed media sheets S not diverted to the duplex path 72 are carried by the media transport to the sheet receptacle 56 in which they are be collected. Before the printed sheets reach the receptacle 56, they pass by an optical sensor 84B. The optical sensor 84B generates image data of the printed sheets and this image data is analyzed by the controller 80 to detect streakiness in the printed images on the media sheets of a print job. Additionally, sheets that are printed with test pattern images are inserted at intervals during the print job. Image data of these test pattern images generated by optical sensor 84B are analyzed by the controller 80 to determine which inkjets, if any, that were operated to eject ink into the test pattern did in fact do so, and if an inkjet did eject an ink drop whether the drop landed at its intended position with an appropriate mass. Any inkjet not ejecting an ink drop it was supposed to eject or ejecting a drop not having the correct mass or landing at an errant position is called an inoperative inkjet in this document. The controller can store data identifying the inoperative inkjets in database 92 operatively connected to the controller 80. These sheets printed with the test patterns are sometimes called run-time missing inkjet (RTMJ) sheets and these sheets are discarded from the output of the print job. A user can operate the user interface 50 to obtain reports displayed on the interface that identify the number of inoperative inkjets and the printheads in which the inoperative inkjets are located. For sheets that are not inverted and merged into the job stream by the operation of pivoting member 86, optical sensor 84A generates image data of the printed side and the controller 80 uses that image data to register the sheets and to operate the ejectors in the printhead to further print images on the previously printed sheet sides. The optical sensors 84A and 84B can be a digital camera, an array of LEDs and photodetectors, or other devices configured to generate image data of a passing surface. While FIG. 1 shows the printed sheets as being collected in the sheet receptacle 56, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, and the dryer 30. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in non-transitory computer readable medium associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, image content data for an image to be produced are sent to the controller 80 from either a scanning system or an online or work station connection for processing and generation of the printhead control signals output to the printhead modules 34A-34D. Along with the image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "image content data" means digital data that identifies an ink image to be printed on a media sheet.

Figure 3:
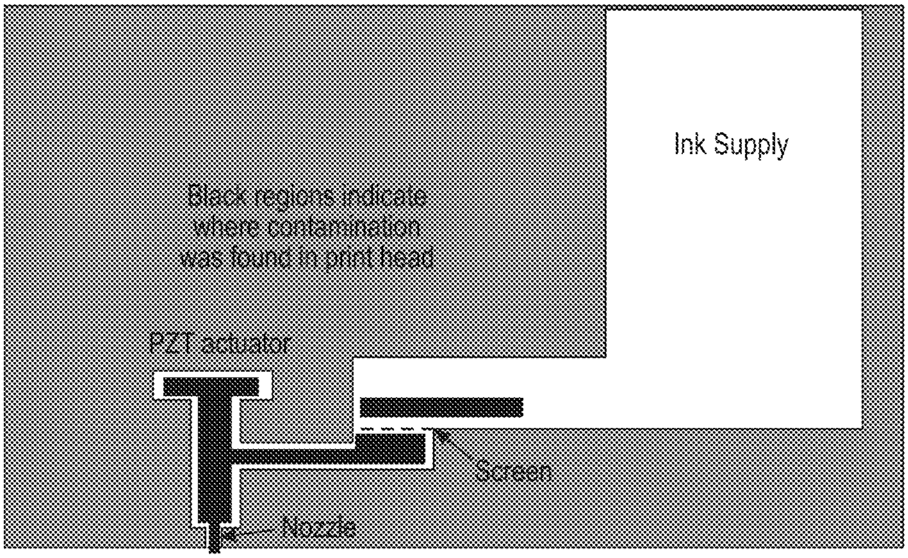
FIG. 3 is a diagram of the ink flow paths in a printhead into which a high pH liquid is injected to preserve the operational status of the inkjets in the printhead during a long period of printer inactivity.

FIG. 3 shows the ink flow paths to a nozzle that are susceptible to ink contamination. These paths include the ink nozzle 304, the piezoelectric actuator 308, the manifold 312 that leads to the nozzle, and the volumes immediately adjacent the opposite sides of the rock screen 316. To prevent ink contamination in this paths, a high pH fluid is injected into these paths as described more fully below.

Figure 4A:
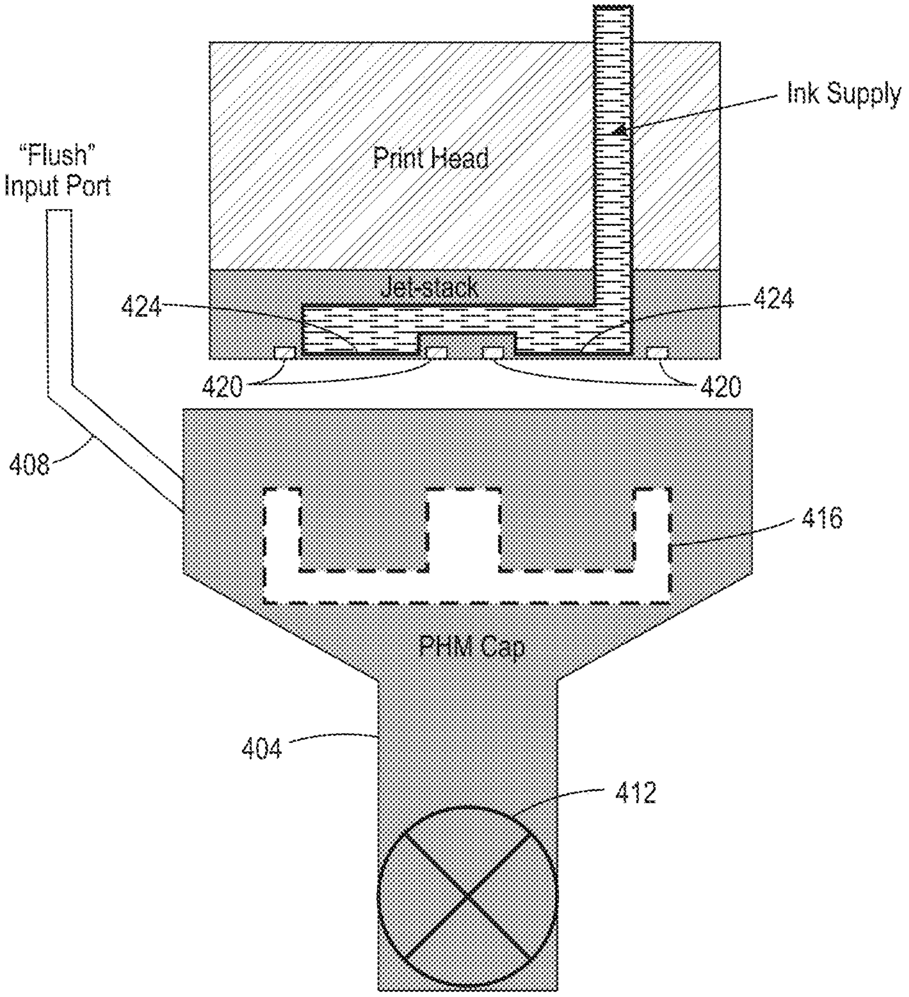
FIG. 4A shows a side view of a printhead being serviced with a printhead maintenance station configured to inject a high pH liquid the ink flow paths shown in FIG. 3.
Figure 4B:
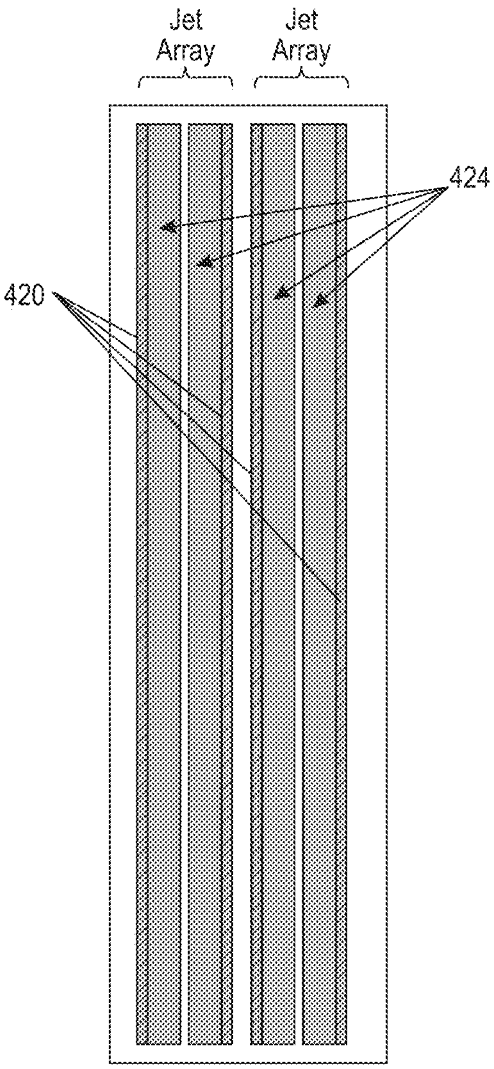
FIG. 4B is a bottom view of the printhead shown in FIG. 4A.

A side view of a printhead maintenance station 32 and its interaction with a printhead 204 to inject a high pH liquid is shown in FIG. 4A. The printhead cap 404 that covers the printhead nozzle plate during the period of printer inactivity includes a port 408 for supplying a high pH fluid to the cap while the drain valve 412 is closed so the level of the high pH fluid nears the top of the cap 404. A vent blocking member 416 is positioned within the printhead cap 404 so when the printhead is lowered to cover the nozzle plate with the high pH liquid held within the cap 404, portions of the member block the manifold vents 420. The manifold blocking member 416 is made of a pliable material such as polyurethane or rubber. Once the cap is covering the nozzle plate and the vent blocking member is blocking the manifold vents, a vacuum is supplied to the ink supply line 428 to pull the ink meniscus at the nozzle openings within the printhead so the high pH fluid rises in the ink flow paths of the printhead to a side of the rock screen 432 that is opposite the passageway to the nozzle. Once the high pH fluid is pulled past the rock screen 432, the printhead is raised enough to separate the vent blocking member 416 from the manifold vents so the high pH fluid is also pulled into the manifold vents and into the manifolds fluidly connected to the vents. During the transfer of high pH fluid into the printhead, the port 408 remains open so high pH fluid flows into the cap and remains in contact with the nozzle plate. The vacuum is then terminated so ink flows into the printhead and the meniscus at the nozzles returns to the nozzle openings. At the end of the printer inactivity period, the drain valve 412 is opened so the high pH fluid is drained from the cap 204. The PHM 32 is then operated in a known manner to purge ink from the nozzles of the printhead and the nozzle plate is wiped so the high pH fluid is flushed and removed from the printhead and its nozzle plate.

The high pH fluid can be made from an ink used in the printer that has been buffered to a pH of 8 or more by adding a base such as triethanolamine, triethylamine, diethylamine, dimethylethanolamine, KOH, or NaOH. Alternatively, a known printhead cleaning/flushing solution, such as KF200 or CL67 available from Nippon Kayaku, is buffered to a pH of 8 or more by adding one of the bases identified above. In another embodiment, the high pH fluid is a solution consisting of water, propylene glycol, hexanediol, butane diol, glycol ethers, glycerol, surfactants and bases like triethylamine, hydrazine, dimethylethanolamine, KOH, NaOH, or the like. As used in this document, the term "high pH fluid" means a liquid having a pH of at least 8 and not more than 12.

Figure 5:
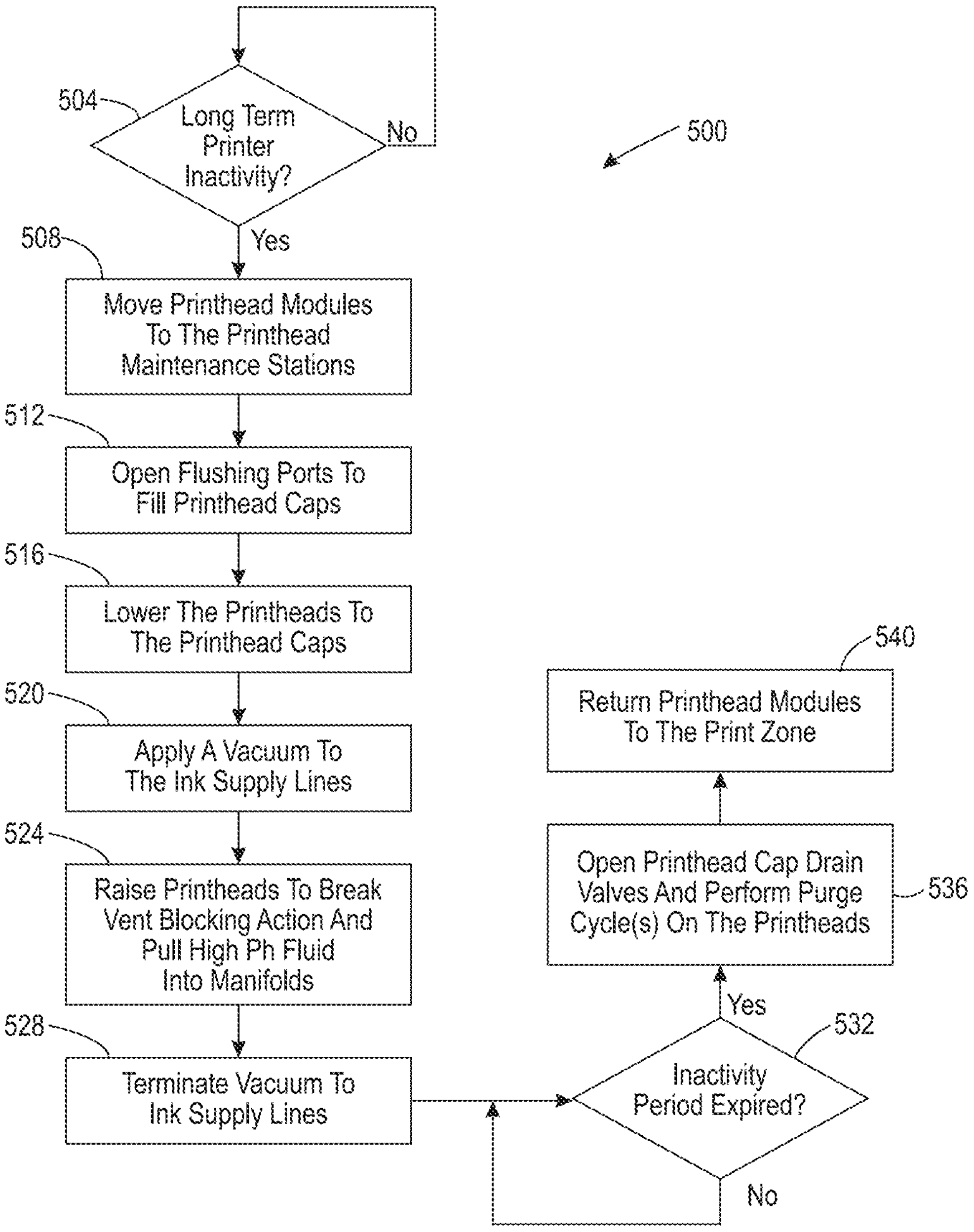
FIG. 5 is a flow diagram for operating the printhead maintenance station of FIG. 4A.

A process 500 for operating the printhead maintenance station that injects high pH fluid into the printheads of an inkjet printer is shown in FIG. 5. In the description of the process, statements that the process is performing some task or function refers to a controller or general purpose processor executing programmed instructions stored in non-transitory computer readable medium operatively connected to the controller or processor to manipulate data or to operate one or more components in the printer to perform the task or function. The controller 80 noted above can be such a controller or processor. Alternatively, the controller can be implemented with more than one processor and associated circuitry and components, each of which is configured to perform one or more tasks or functions described herein. Additionally, the steps of the method may be performed in any feasible chronological order, regardless of the order shown in the figures or the order in which the processing is described.

The process 500 of FIG. 5 begins by detecting a signal that a printer is going to enter a long term of printer inactivity (block 504). The printhead modules are moved to positions opposite the PHMs 32 (block 508). The flushing ports to the printhead caps are opened so high pH fluid fills the caps (block 512). The printheads are lowered so the vent blocking members in the printhead caps block the manifold vents on the printheads and the high pH fluid contacts the nozzle plates of the printheads (block 516). A vacuum is applied to the ink supply line and the high pH fluid is injected into the printheads to a position past the rock screens in the printheads (block 520). The printheads are raised sufficiently to break the blocking action of the vent blocking members on the manifolds so the vacuum pulls high pH fluid through the vents into the manifolds (block 524). The vacuum to the ink supply lines is then released to return the meniscus of the high pH fluid to the nozzle openings (block 528). When the printer inactivity period expires (block 532), the cap drain valve is opened to drain the high pH fluid from the printhead caps and a known purge cycle is performed to flush and remove the high pH fluid from the printheads and their nozzle plates (block 536). The printhead modules can then be returned to the print zone for printing operations.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A printhead maintenance station comprising:

a printhead cap configured to cover a face of a printhead;

a volume of high pH fluid retained in the printhead cap, wherein the high pH fluid has a pH level of at least 8 and no more than 12;

an opening in the printhead cap, the opening configured to allow the volume of high pH fluid to enter the printhead cap;

a printhead vent blocking member configured to block manifold vents in the printhead when the printhead is moved to engage the printhead vent blocking member; and a valve configured to open and close, the valve being positioned within the printhead cap to enable the printhead cap to hold the volume of high pH fluid in the printhead cap when the valve is closed and to enable egress of the high pH fluid from the printhead cap when the valve is opened.

2. The printhead maintenance station of claim 1 wherein the printhead vent blocking member is made of a pliable material.

3. The printhead maintenance station of claim 2 wherein the pliable material is either polyurethane or rubber.

4. The printhead maintenance station of claim 1, the opening in the printhead cap being configured to open to enable the high pH fluid to enter the printhead cap and to close to prevent a flow of the high pH fluid into the printhead cap.

5. An inkjet printer comprising:

at least one printhead module configured with at least one printhead;

a printhead maintenance module including a volume of high pH fluid retained in a printhead cap, the high pH fluid comprising a liquid and a base added to the liquid that raises the pH level of the liquid to at least 8 and no more than 12, and the printhead cap having a manifold vent blocking member, an opening in the printhead cap, a printhead vent blocking member configured to block manifold vents in the printhead when the at least one printhead is moved to engage the printhead vent blocking member, and a valve configured to open and close, the valve being positioned within the printhead cap to enable the printhead cap to hold the high pH fluid entering the printhead cap through the opening in the printhead cap when the valve is closed and to enable egress of the high pH fluid from the printhead cap when the valve is opened; and a controller operatively connected to the at least one printhead module and the printhead maintenance station, the controller being configured, during periods of inactivity of the printhead module of at least two hours, to:

fill the printhead cap with the high pH fluid;

lower the at least one printhead onto the printhead cap to block manifold vents in the printhead and contact the nozzle plate of the printhead with the high pH fluid; and apply a vacuum to an ink supply line of the printhead to pull the high pH fluid into the printhead.

6. The inkjet printer of claim 5, wherein the pH level of the liquid and base is no more than 12, the controller being further configured to:

direct the high pH fluid through the opening in the printhead cap to fill the printhead cap with the high pH fluid.

7. The inkjet printer of claim 6, wherein the fluid is selected from the group of consisting of water, propylene glycol, hexanediol, butane diol, glycol ethers, glycerol, and surfactants, wherein the base is selected from the group consisting of triethylamine, hydrazine, dimethylethanolamine, KOH, and NaOH, and wherein the controller is further configured to:

lower the at least one printhead until the manifold vents in the at least one printhead contact the manifold vent blocking member in the printhead cap.

8. The inkjet printer of claim 7, the controller being further configured to:

continue to apply the vacuum to the ink supply line until the high pH fluid passes through a screen within the printhead.

9. The inkjet printer of claim 8, the controller being further configured to:

move the printhead away from the printhead cap to open the manifold vents in the printhead; and continue to apply the vacuum to the ink supply line to pull the high pH fluid into the manifolds within the printhead that are fluidly connected to the manifold vents.

10. The inkjet printer of claim 9, the controller being further configured to:

terminate application of the vacuum to the ink supply line to enable a meniscus of the high pH fluid to be present at nozzle openings in the at least one printhead.

11. The inkjet printer of claim 10, the controller being further configured to:

open a printhead cap drain valve to enable the high pH fluid to egress from the printhead cap.

12. The inkjet printer of claim 11, the controller being further configured to:

perform a purge cycle on the printhead to flush the high pH fluid from the printhead.

* * * * *